US008095566B2

(12) United States Patent
Thomas

(10) Patent No.: US 8,095,566 B2
(45) Date of Patent: Jan. 10, 2012

(54) MANAGING MEDIA FILES FROM MULTIPLE SOURCES

(75) Inventor: Edward Eric Thomas, Seattle, WA (US)

(73) Assignee: Research in Motion Limited, Waterloo, Ontario (CA)

( * ) Notice: Subject to any disclaimer, the term of this patent is extended or adjusted under 35 U.S.C. 154(b) by 419 days.

(21) Appl. No.: 12/177,101

(22) Filed: Jul. 21, 2008

(65) Prior Publication Data
US 2009/0282057 A1 Nov. 12, 2009

Related U.S. Application Data

(60) Provisional application No. 61/127,796, filed on May 14, 2008, provisional application No. 61/127,813, filed on May 14, 2008, provisional application No. 61/052,640, filed on May 12, 2008, provisional application No. 61/052,633, filed on May 12, 2008.

(51) Int. Cl.
G06F 7/00 (2006.01)
G06F 17/30 (2006.01)

(52) U.S. Cl. ........................................ 707/796; 707/812

(58) Field of Classification Search .......... 707/600–831; 84/601, 612; 715/716, 733, 737, 748, 751
See application file for complete search history.

(56) References Cited

U.S. PATENT DOCUMENTS

| 5,713,013 A | 1/1998 | Black |
| 6,072,479 A | 6/2000 | Ogawa |
| 6,295,541 B1 | 9/2001 | Bodnar et al. |
| 6,549,922 B1 | 4/2003 | Srivastava et al. |
| 6,744,815 B1 | 6/2004 | Sackstein et al. |
| 7,260,312 B2 * | 8/2007 | Srinivasan et al. ............ 386/248 |
| 7,346,687 B2 | 3/2008 | Lipscomb et al. |
| 7,680,849 B2 | 3/2010 | Heller et al. |
| 2002/0099737 A1 | 7/2002 | Porter et al. |
| 2002/0103919 A1 | 8/2002 | Hannaway |
| 2002/0148343 A1 | 10/2002 | Gross |
| 2003/0236695 A1 | 12/2003 | Litwin, Jr. |
| 2004/0034650 A1 | 2/2004 | Springer et al. |
| 2004/0126038 A1 | 7/2004 | Aublant et al. |
| 2004/0205638 A1 | 10/2004 | Thomas |
| 2004/0267825 A1 | 12/2004 | Novak et al. |
| 2005/0010616 A1 | 1/2005 | Burks et al. |
| 2005/0015389 A1 | 1/2005 | Novak et al. |
| 2005/0015551 A1 | 1/2005 | Eames et al. |
| 2005/0021470 A1 * | 1/2005 | Martin et al. ................... 705/51 |
| 2005/0131959 A1 | 6/2005 | Thorman et al. |
| 2005/0165752 A1 | 7/2005 | Mathew et al. |

(Continued)

FOREIGN PATENT DOCUMENTS
EP 1227396 A1 7/2002
(Continued)

OTHER PUBLICATIONS

R. Mohan et al., Adapting multimedia Internet content for universal access, Mar. 1999, IEEE, vol. 1, 104-114.*

(Continued)

Primary Examiner — Jean B Fleurantin
(74) Attorney, Agent, or Firm — Schwegman Lundberg & Woessner, P.A.

(57) ABSTRACT

Apparatus and methods to manage media files from multiple sources provide a mechanism to enhance user interaction with multimedia devices. Additional apparatus, systems, and methods are disclosed.

25 Claims, 9 Drawing Sheets

U.S. PATENT DOCUMENTS

| | | |
|---|---|---|
| 2005/0210119 A1 | 9/2005 | Kumar |
| 2006/0004699 A1 | 1/2006 | Lehikoinen et al. |
| 2006/0069998 A1 | 3/2006 | Artman et al. |
| 2006/0163358 A1 | 7/2006 | Biderman |
| 2006/0188215 A1 | 8/2006 | Matsutani |
| 2006/0242259 A1* | 10/2006 | Vallabh et al. ............... 709/217 |
| 2007/0005653 A1 | 1/2007 | Marsh |
| 2007/0043765 A1 | 2/2007 | Chan et al. |
| 2007/0050366 A1 | 3/2007 | Bugir et al. |
| 2007/0112844 A1 | 5/2007 | Tribble et al. |
| 2007/0198602 A1 | 8/2007 | Ngo et al. |
| 2007/0233702 A1 | 10/2007 | Ohkita et al. |
| 2007/0271310 A1 | 11/2007 | Han et al. |
| 2008/0109449 A1 | 5/2008 | Chun et al. |
| 2009/0282020 A1 | 11/2009 | McSheffrey et al. |
| 2009/0282050 A1 | 11/2009 | Thomas |
| 2009/0282077 A1 | 11/2009 | Thomas |
| 2009/0282078 A1 | 11/2009 | Thomas et al. |
| 2009/0282088 A1 | 11/2009 | Thomas et al. |

FOREIGN PATENT DOCUMENTS

| | | |
|---|---|---|
| EP | 6549922 | 4/2003 |
| EP | 20070233702 A1 | 10/2007 |
| EP | 1923797 A1 | 5/2008 |
| JP | 2002041823 | 2/2002 |
| JP | 2002182658 | 6/2002 |
| JP | 2008538843 | 11/2008 |
| WO | WO-0063801 A1 | 10/2000 |
| WO | WO-02075539 A2 | 9/2002 |
| WO | WO-03036541 A1 | 5/2003 |
| WO | WO-2005116868 A1 | 12/2005 |
| WO | WO-2006116368 A2 | 2/2006 |
| WO | WO-2007145854 A1 | 12/2007 |
| WO | WO-2008008448 A2 | 1/2008 |

OTHER PUBLICATIONS

Rocha et al., Middleware for multi-client and multi-server mobile applications, Apr. 16, 2007, IEEE, 437-441.*

Sinitsyn, et al., "A Synchronization Framework for personal mobile server", *Proceeding of second IEEE Annual conferenece on Piscataway*, (Mar. 14, 2004), 208-212.

Vetro, A, et al., "Media conversion to support mobile user", *Electrical and computer Engineering*, (May 13, 2001), 607-612.

Peery, C, et al., "Wayfinder: Navigating and Sharing Informations in a Decentralized World", *Lecture Notes in Computer Science, Databases, Information Systems, and Peer-to-Peer Computing*, vol. 3367/2005, (2005), 200-214.

Sinitsyn, A, "A synchronization framework for personal mobile servers", Proceedings of the Second IEEE Annual Conference on Pervasive Computing and Communications Workshops, (Mar. 14, 2004), 208-212 Pgs.

"U.S. Appl. No. 12/177,105, Response filed Jul. 12, 2011 to Final Office Action mailed Apr. 12, 2011", 5 pgs.

"U.S. Appl. No. 12/177,112, Final Office Action mailed Jun. 13, 2011", 19 pgs.

"U.S. Appl. No. 12/177,137, Response filed Jun. 13, 2011 to Restriction Requirement mailed May 12, 2011", 13 pgs.

"Canadian Application Serial No. 2660224, Office Action mailed Feb. 3, 2011", 3 pgs.

* cited by examiner

MANAGING MEDIA FILES FROM MULTIPLE SOURCES

RELATED APPLICATION(S)

This application claims the benefit of priority under 35 U.S.C. 119(e) to U.S. Provisional Patent Application Ser. No. 61/127,796 filed 14 May 2008, to U.S. Provisional Patent Application Ser. No. 61/127,813 filed 14 May 2008, to U.S. Provisional Patent Application Ser. No. 61/052,640 filed 12 May 2008, and to U.S. Provisional Patent Application Ser. No. 61/052,633 filed 12 May 2008, which are incorporated herein by reference in their entirety.

BACKGROUND

Individuals in modern society have access to information and media far beyond what they create individually. Most of this media comes from information sources that are not under the individual's direct control. These information sources typically add their own information which remains part of the media itself. Improvements to the management of this media enhance one's ability to interact with others, to respond to changing needs, and to avail oneself of enjoyment from processing various media based information.

BRIEF DESCRIPTION OF THE DRAWINGS

Embodiments of the invention are illustrated by way of example and not limitation in the figures of the accompanying drawings in which.

DETAILED DESCRIPTION

Figure 1:
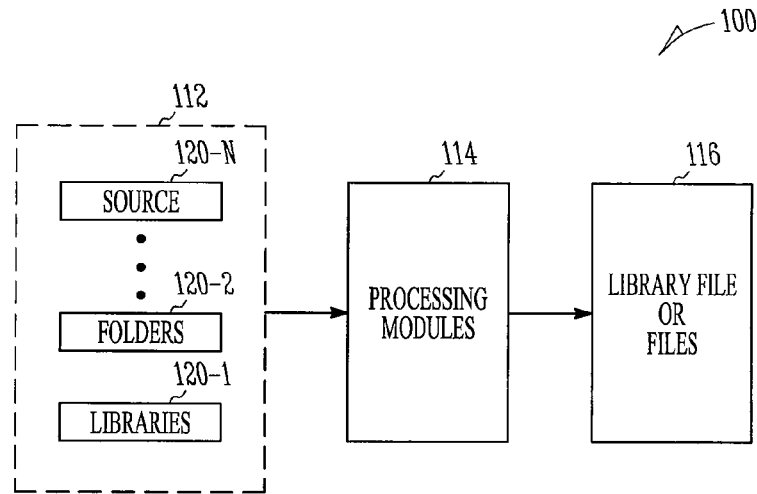
FIG. 1 is a functional block diagram of system for managing media content, according to various embodiments.

The following detailed description refers to the accompanying drawings that show, by way of illustration, details and embodiments in which the invention may be practiced. These embodiments are described in sufficient detail to enable those skilled in the art to practice embodiments of the present invention. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

In various embodiments, media content is managed in a system, where the media content may include information from information sources that are not under a system user's individual's direct control. These information from these sources may add artifacts of the flow of information. These artifacts can be used, with knowledge of their properties, to empower the system user to treat all of their media as if from one source or at least to discover the source of media and the interactions thereof. Systems and methods for managing media content may be configured such that the management may be conducted with limited user interaction and, in various embodiments, the system may perform essentially autonomously. Media is a form of general communication, information, or entertainment, which is typically intended to be used by a large audience, thought not limited to a large audience. Various media may include, but are not limited to, music, movies, music videos, television shows, interactive applications, audiobooks, podcasts, games, personal presentation, and other presentations. Each form of media may be referred to as media content or media art. An individual item of such media may be referred to as media content or media art. Media content may include content in any media format. Some examples of content may include, but are not limited to, audio files, video files, image files, and multimedia files. Audio file formats may include, but are not limited to, MP3, AIFF, WAV, MPEG-4, AAC, and Apple Lossless. Other example file formats for media content include, but are not limited to, files having extensions doc, dot, wpd, txt, xls, pdf, ppt, jpg, jpeg, png, bmp, gif, html, htm, zip, tif, tiff, and wmf. Associated with a item of media art that is stored or processed on an apparatus is a media file, which when operated on by an associated playing device (player) provides an output that can be presented as communication, information, entertainment, other presentations, or combinations thereof for the user.

Systems that manage media content may include various apparatus such as computer systems or other systems having hardware, software, and/or hardware and software to manage media content. In various embodiments, a personal computer (PC) can be used to manage media content and associated media files. A personal computer, as is generally known, herein refers to computing devices having an operating system (OS) such that use of the personal computer may be conducted by individuals having little or no knowledge of the basics of the underlying hardware and software that operate the PC and whose operation may be conducted without individuals typically authoring computer programs to operate the computer. Portable computers may include portable personal computers. An example of a portable PC is a laptop computer or notebook computer that typically has a display screen, keyboard, underlying hardware and software, and a display pointing device that are all integrated in a housing that can easily be carried by an individual. Some personal digital assistants (PDAs) may be viewed as a type of portable computer. In various embodiments, a PC may include instrumentality for managing media content and instrumentality to operate as a wireless server. A wireless server is a server configuration that communicates with an entity over a channel established by the entities in a wireless network.

Various instrumentalities can be realized in hardware implementations, software implementations, and combinations of hardware and software implementations. Some portions of the instrumentalities may be described in terms of algorithms and symbolic representations of operations on data bits within a machine memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. The instrumentality may operate to process, compute, calculate, determine, display, and/or conduct other activities correlated to processes of a machine such as a computer system, or similar electronic computing device, that manipulates and transforms data represented as physical (electronic) quantities within the computer system's registers and memories into other data similarly represented as physical quantities within the computer system memories or registers or other such information storage, transmission or display devices. The instrumentality may provide personalized capabilities, provide a pathway to other content, or combinations thereof. The instrumentality may use distributed applications, different numbers and types of software based components that couple two or more applications to enable data transfer between the applications, hardware to provide services from a number of different sources, and may be realized on a variety of platforms such as servers and content management systems. The instrumentality may include or provide access to subroutine code, code libraries, application program interfaces such as interpreters utilizing Java EE™, Simple DirectMedia Layer™ (SDL) and DirectX™, combinations thereof, or other such electronic based functionalities.

In various embodiments, a PC manages media content in relationship to one or more mobile devices. Each mobile device can play media files and can interact with the PC with respect to the management of media content on the respective mobile device. In various embodiments, the mobile devices include instrumentalities similar to those of the PC to manage the media content on the mobile device, to browse media files in one or more PCs, and to engage with a PC in interactive management of media content on the mobile device, on the PC, and on other mobile devices in which the media content may be shared. Other apparatus configured with hardware, software, and/or hardware and software to function in a similar manner as the PC to manage media content may be used in conjunction with the mobile devices. The mobile devices may be a mobile wireless communications devices. The mobile wireless communications devices may include, but are not limited to, mobile telephones, portable computers, PDAs, and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer.

In an embodiment, a system organizes information associated with media content from multiple media sources into a single unified library file. The information may be organized as indexed information. Managing media content is not limited to a single library file. In various embodiments, more than one library file may be utilized. Access to a library file can be provided to a number of mobile devices. The access may be provided as full access or limited access. For example, access to a library file by a mobile device may be limited to a mobile device based on whether the mobile device has one or more media players to operate on the media content. Other criteria may be used to limit access to a mobile device. In various embodiments, the library file is maintained on the system and is accessed from the mobile device remotely. In various embodiments, a library file or a modified version of a library file can be transferred to the mobile device and the mobile device can access the library file locally. The library file can be used by the mobile device to transfer media content from one or more media sources to the mobile device. The mobile device may have wireless capabilities. The mobile device may be a mobile wireless communication device.

FIG. 1 is a functional block diagram of system 100 for managing media content. System 100 includes inputs 112, processing modules 114, and outputs 116. Inputs 112 include one or more media sources 120 of media content (also herein referred to as "media sources," "media source," "sources," or "source"). Media content may include content in any media format. Some examples of content may include, but are not limited to, audio files, video files, image files, and multimedia files. Audio file formats may include, but are not limited to, MP3, AIFF, WAV, MPEG-4, AAC, and Apple Lossless. Other example file formats for media content include, but are not limited to, files having extensions doc, dot, wpd, txt, xls, pdf, ppt, jpg, jpeg, png, bmp, gif, html, htm, zip, tif, tiff, and wmf.

Media sources 112 may include media libraries 120-1 for media players such as, but not limited to, libraries for iTunes® audio players, Windows Media Player® (WMP), RealPlayer®, and other players. Each library may include collections of various media content. A collection is a subset of the files in a library. The collections may include references to the files. Each collection may refer to anywhere from zero files to all of the files in the library. An example of a collection of a music library is a playlist. In various embodiments, sources 112 of media content may be files within one or more folders 120-2 on a single computer system or on multiple computer systems.

Processing modules 114 include software and/or hardware to transfer media content from media sources to devices that use the associated media. Processing modules include instrumentality to operate as a "connector," which means that the processing modules interface with media sources to collect information associated with a media file configured to operate with a specific media player. Processing modules may be arranged with a set of connectors, one for each type of media player incorporated in system 100 or used by mobile devices whose media content is managed by system 100. Processing modules 114 may include connectors to interact with mobile wireless communication devices, where the mobile wireless communication devices are a source of media content. Processing modules 114 may use, but are not limited to, a Windows COM interface or a XML file when connecting to various media sources. In addition, processing modules 114 may create a representation (for example, a library or libraries of information regarding the media content) of the media content available from multiple media sources. In various embodiments, media content may include information with respect to another media file that is played by a media player. For instance, a jpeg (Joint Photographic Experts Group) file may be a file of album art for songs on an album, where the media files of the songs are played on a media player.

In various embodiments, output 116 from processing modules 114 is a representation created by processing modules 114. The representation may also be maintained by processing modules 114. Output 116 may include device specific data for a mobile wireless communication device or a media player. Output 116 may comprise metadata, such as metadata based on user preferences or device settings. Generally, metadata is information about data. Various media content may be metadata with respect to other media content. For example, a file having a jpg file format may provide information regarding an audio file having a mp3 file format such that the jpg file is metadata for the mp3 file.

In an example embodiment, the representation may be any means for identifying the content of the media source files. In some embodiments, a library file 116 created by processing modules 114 contains metadata for the media content available in the one or more media sources 120-1 . . . 120-N, but omits the actual media content. Library file 116 may be organized using a standard format that represents the information contained in the media sources. In various embodiments, the standard format is a compressed format and/or a format that is substantially smaller than the media library itself. For example, a media library with 30 GB of audio files may be presented by processing modules 114 in a file that may be 200 KB.

In operation, system 100 for managing media content shown in FIG. 1 creates a representation of the media content available in one or more media sources 120-1 . . . 120-N and provides a means for accessing the media content by any device with a media player including a mobile wireless communications device. The device may browse the representation and may select individual media content items to copy or transfer from the media source to the device. After selection, all or a portion of the media content item may be transferred to the device and may be played on a media player on the device. In various embodiments, system 100 brings content from multiple media sources into a single unified library 116 and pushes out device specific metadata from the single library to the specific device.

Figure 2:
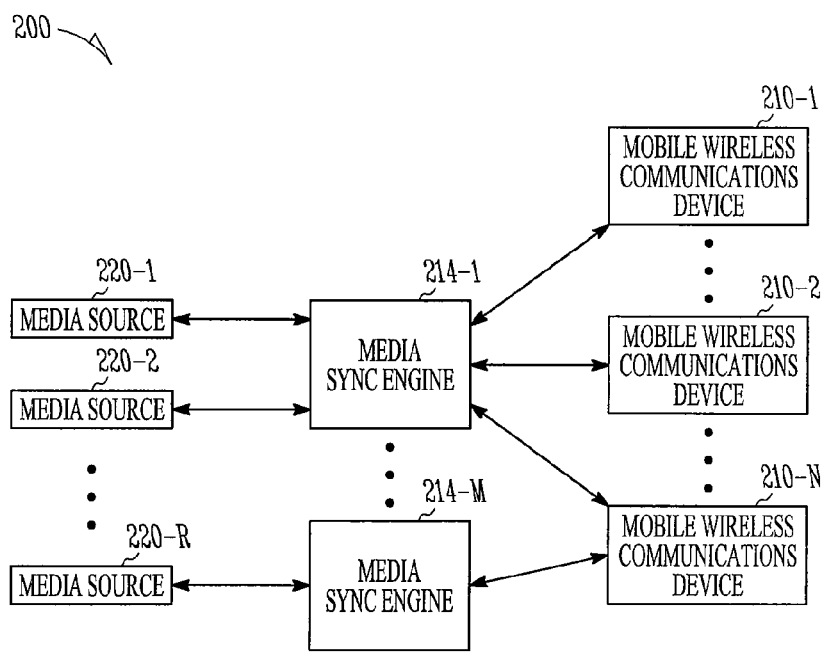
FIG. 2 shows a block diagram of an architecture for transferring media content between media synchronization engines of a system and mobile wireless communications devices, according to various embodiments.

FIG. 2 is a block diagram of an architecture for transferring media content between media synchronization engines 214-1 . . . 214-M of a system 200 and mobile wireless communications devices 210-1 . . . 210-N. The media content can be provided from media sources 220-1 . . . 220-R. Media sources 220-1 . . . 220-R can reside on system 200. The media content in media sources 220-1 . . . 220-R may be provided from various sources external to system 200. For instance, media sources 220-1 . . . 220-R can be media libraries resident on system 200 that are created as libraries to store media files provided by media stores accessed on the Internet. Media sources 220-1 . . . 220-R may contain media files loaded in the system by a user from a portable storage medium such as, but not limited to, a CD or a DVD. Mobile wireless communications devices 210-1 . . . 210-N may also be media sources. Media synchronization engines 214-1 . . . 214-M (also referred to as a media sync engines or a media sync applications) that operate in the transferal of a media file may also operate to manage a media library and a metadata library file associated with the media file. The media file can be operated on by a media player to provide the media content for visual and/or audio presentation to a user of system 200 or one or more of mobile wireless communications devices 210-1 . . . 210-N.

Media sync engines 214-1 . . . 214-M can create representations (such as a library file or files) identifying media content available from multiple media sources and provide data from the library to mobile wireless communications devices 210-1 . . . 210-N. In an embodiment, a media sync engine is an example of the processing modules shown in FIG. 1. In various embodiments, a media sync engine provides a method to synchronize a media library such as an iTunes® digital music library with a smartphone such as a BlackBerry brand smart phone. The files may be transferred using a wireless connection or a wired connection such as a high speed USB 2.0 connection.

Mobile wireless communications devices 210 may include, but are not limited to, mobile telephones, portable computers, personal digital assistants (PDAs), media players and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer. Multiple devices of different types/capabilities may transfer media content using one or more media sync engines.

Figure 3:
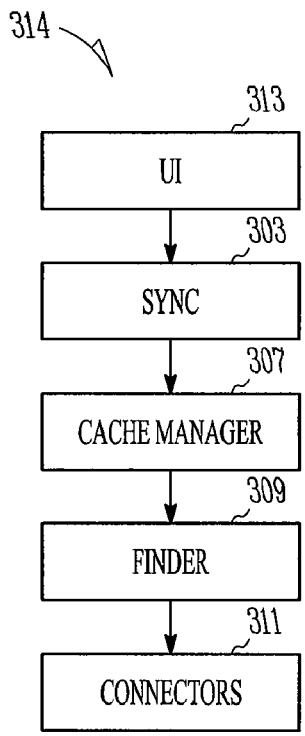
FIG. 3 illustrates a block diagram of a processing module that provides functionality similar to that of the processing modules shown in FIG. 1, according to various embodiments.

FIG. 3 illustrates a block diagram of a processing module 314 that provides at least the functionality of the processing modules shown in FIG. 1 according to an example embodiment. Processing module 314 may reside on a PC that interacts with one or more mobile devices. Processing module 314 includes a sync module 303, a cache manager 307, a finder 309, and one or more connectors 311. Sync module 303 includes instrumentality to conduct synchronization operations with the mobile devices, where the operations include adding media files to and removing media files from the mobile devices. Sync module 303 can interact with a mobile device to determine its identity and acquire information on the availability of allocated media storage on the mobile device. Sync module 303 is configured to operate with a user interface (UI) 313 of the PC.

Connectors 311 identify specific instances of a particular type of library on the PC or mobile device. In other words, connectors 311 perform a discovery function that finds individual libraries. A connector for a particular library is capable of communicating with a particular library or file using a corresponding application programming interface (API), protocols, file formats, etc. When an individual library is discovered, the connector can retrieve media collections from that instance of the individual library. Connectors 311 may include an iTunes connector, a WMP connector, a RealPlayer connector, and various other connectors correlated to instrumentality for operating on the respective media files to provide a presentation to the PC user. An individual connector may be configured as a combination of a read only connector and a writeable connector. A writeable connector may perform such activities as adding a user-assigned rating for a song, creating a playlist, editing a playlist, deleting a song, etc.

Finder 309 provides a discovery mechanism for connectors. Finder 309 may identify what connectors 311 are available for processing. The available connectors may register with finder 309. If a separate connector is used for each type of library, the particular connectors that are discovered by finder 309 can determine what type of libraries are in the system in which processing modules 314 operate.

Cache manager 307 may also determine which of the available connector(s) to use. For example, if a collection of media content may be accessed either by using iTunes software or through an iTunes xml file, cache manager 307 can determine whether to use the iTunes application connector or the iTunes xml file connector in order to access the iTunes collection. Cache manager 307 may provide a unified interface to multiple sources/libraries. Cache manager may maintain a buffer that unifies files from different libraries. For example, if the same music track is present in multiple libraries (e.g., in a user's iTunes library and in the user's Windows Media Player library), the cache manager may maintain a single buffer that is an aggregation of the tracks from the different libraries. Alternatively, cache manager 307 may maintain a separate buffer for each of the different libraries. Cache manager 307 may implement the buffer using any form of data storage. In various embodiments, the data storage may either be persistent or non-persistent.

In various embodiments, cache manager 307 may implement connector watchers. A connector watcher monitors one or more collections and determines when a collection has changed. For example, if an iTunes xml file changes or if the iTunes library has been updated, cache manager 307, which monitors that particular collection, detects the update and reads the changes into an appropriate buffer. Cache manager 307 may also determine when to update the device library.

Embodiments, as illustrated in FIGS. 1-3, and similar embodiments may be implemented as a desktop application to transfer media content from multiple sources to a mobile wireless device. The desktop application for managing media content may be launched on a PC. The desktop application may be automatically launched on startup of the PC. The desktop application may be launched on detection of a device connection to the PC. In various embodiments, a user may launch the desktop application. Alternatively, embodiments, as illustrated in FIGS. 1-3, and similar embodiments may be implemented to allow a mobile wireless device to update content already present on the mobile wireless device with media content from multiple sources.

In various embodiments, a system managing media content can be structured to operate provide a number of different features. Content from multiple media sources may be entered into a single unified library and device specific metadata pushed out from the single library. A library file in a format to provide a compact representation of media metadata may be generated as output of processing modules, similar to processing modules discussed with respect to FIGS. 1-3. Varying schema can be used for choices to select, group, and rearrange data in the representation in the file format. Various features of a managing system may include maintaining representations of original source identifications so that an identifier such as an ID, a path, etc. may be used to track/manage information regarding different multiple sources of substantially the same media content. Various features of a managing system may include injecting or modifying metadata for a media file during transfer to a device. Examples of injected metadata may include album art, volume settings and other device settings, user preferences, and other parameters.

Management of media content on a mobile device may be realized through interaction with a media sync engine of one or more apparatus, such as multiple PCs. The mobile device, such as a mobile wireless communication device, through such interaction acquires information regarding the availability of media files on each PC and an identity of the PC that was the source of media content existing on the mobile device.

Various features of the managing system may include a simplified user interface (UI) on the PC for transferring information to the mobile device and representing information that is present on the mobile device. The UI may generate representations to provide criteria for handling user selection of media content that exceeds device capacity. In various embodiments, applications in the PC may use the information in the library of the PC to autonomously handle user selection of media content that exceeds device capacity. The UI can provide an automatic fill function for a user to select such that the PC automatically handles selection of media content to transfer to the mobile device. In the various embodiments, a mobile device may be a mobile wireless communication device. A mobile wireless communication device may include instrumentality to manage media content in substantially the same manner as a PC.

Figure 4:
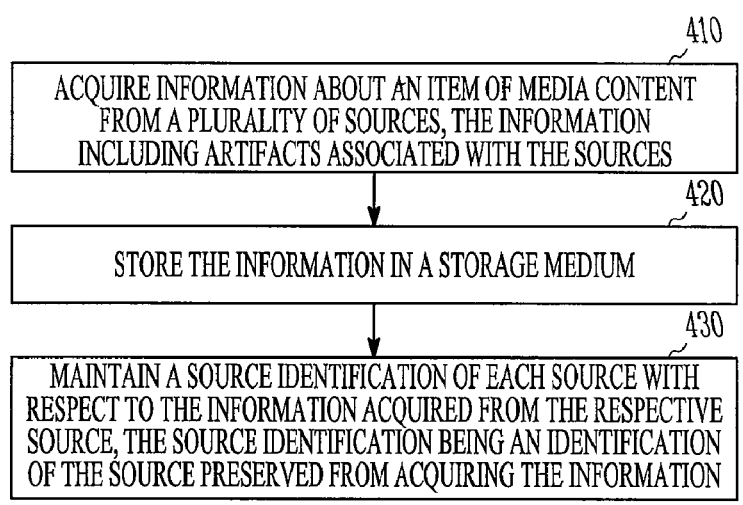
FIG. 4 shows features of a method to maintain identification of multiple sources associated with a media file, according to various embodiments.

FIG. 4 shows features of a method to maintain identification of multiple sources associated with a media file. Various embodiments provide support for multiple sources for the same media file by tracking/managing the source information through an identifier such as an ID, a path, etc. For example, a song may be stored in a PC as a music file obtained as part of an album and the same song may be stored in the PC as a music file obtained as part of another album. In addition, the two albums may have been acquired from two different on-line music stores. Identification of the different sources of the song can be used to manage the instances of the song on the PC. At 410, information about an item of media content is acquired from a plurality of sources, where the information includes artifacts associated with the sources. Each artifact associated with the respective source may be assigned a confidence level. The media content may include a media file. At 420, the information is stored in a storage medium. The information may be stored in a library file, where the library file is a file of metadata associated with the media file. The information may be stored in a library in a computer memory. Confidence levels associated with the information may also be stored. At 430, an identification of each source with respect to the information acquired from the respective source is maintained, where the source identification is an identification of the source preserved from acquiring the information. The source identification may be maintained in a library file.

In various embodiments, metadata is acquired from multiple sources and stored while preserving the ability to look up the metadata from storage without a normalizing process when the metadata is first placed in storage. The metadata may be source IDs identifying the source from which a media file is obtained. For example, iTunes IDs and WMP IDs or other media source IDs can be used in the same application without explicitly assigning a new ID to correlate the sources. In addition, managing media content while preserving source IDs allows for new IDs related to another entity relative to the same application to be added to a system at any time such that the various IDs may be continued to be correlated.

Preserving the identification of sources allows for a discovery of the capabilities of the source using the same mechanism. For example, an iTunes API connector could disclose, via its schema, that it supports album art, while an iTunes XML file connector does not announce its support for this feature. Preserving the identity of the source of metadata allows an application to present to a user information regarding characteristics of media content of the user's system. For example, such a mechanism allows for generation of a presentation that informs a user how much music came from iTunes on his PC versus how much music came from WMP on another PC. Other information may be provided such as a breakdown of the specific music, videos, multimedia presentations, or other presentations that originated from particular sources via different routes. Further, preservation of the source ID allows a system to operate without converting metadata to a 'one true format' with its associated customization of plug-ins to meet the 'one true format.' Without normalizing the source identifications, appropriate applications can be used, while concurrently allowing for the correlation of the artifacts created by these different programs to the various source identifications.

The media file may be managed using the stored artifacts and associated confidence level. A media file may be associated with different media libraries on a PC and metadata with respect to these different media libraries can be acquired. A song by an artist may exist on the PC in an iTunes® music library and may exist on the PC in a Windows Media Player® library. Management of the version of the song may be regulated using information in the form of metadata artifacts acquired in the acquisition processes of iTunes® and Windows Media Player® applications on the PC, where the identification of the source provides additional data points for managing the media files associated with the same song. The confidence levels associated with the artifacts can be used to manage the media files.

In various embodiments, an application on a PC can be structured to obtain additional information regarding media files stored on the PC. On-line sources can be searched for additional information regarding a specified media file or set of media files. Artifacts acquired from searching the on-line sources may be stored in a library file. The library file may include all information regarding the media file. Alternatively, several library files may include information of the media file such that the different library files are indexed as having information regarding the specified media file or set of media files.

For each artifact acquired, a confidence level may be assigned to the artifact. The confidence level can be assigned based on a number of factors. For instance, artifacts acquired as a rating of the quality of a song from each of multiple websites may be assigned a confidence level associated with the website. If the song is a jazz song rated on three websites, collecting data over a period of time may show that one of the three websites rates more jazz songs than the others. This website, relative to a jazz song, may be assigned a higher confidence level for the rating artifact of a jazz song than the other two sources of information. Using artifacts and associated confidence levels stored in the library file associated with the media file, the media file can be managed respect to other media files having respective library files. These library files may be in a common media library. With a large number of jazz songs stored on a PC that has capacity issues, a low rating of a specific jazz song with high confidence, in addition to information of infrequent playing by the user of the PC, may be used to identify the specific jazz song for deletion. Additional information about a media file can be acquired from a mobile wireless communication device that receives media files from the PC for playing on the mobile wireless communication device.

Source identification provides a mechanism for providing a uniform view of media content on an apparatus such as a PC or other device that can play or otherwise use a media file. It is not uncommon for a PC to have multiple media players. For instance, a PC may include iTunes®, Windows Media Player (WMP), and other applications to play music. In addition, music files can be copied on the PC through a variety of different techniques. A music file may be copied from an on-line iTunes® store, copied from an on-line music store providing various formats, ripped from music CDs, or generated on the PC in a number of manners. Each originator can provide an ID associated with the generated music file. In addition, with each copy of the music file, different metadata may be associated with the media file. For instance, a music file may be associated with a movie. Metadata identifying this relationship may be provided by one of the sources. Another source may provide album art associated with the media file. The music file from one source may be generated from album including information such as the track length in the album and other information regarding the album. The music file from one source may be generated including information such as the music genre to which the music file is categorized. All this information may be artifacts with the creation of the media file on the PC. In various embodiments, the relationship of the artifacts with the source can be maintained in the PC through maintaining the ID of the source.

Each source ID can be categorized according to uniqueness and permanency. For instance, at creation of a music file in iTunes®, it may be assumed that the ID created was a permanent ID designed to be globally unique amongst all IDs generated by iTunes® on ay machine and designed to last a very long time. Whereas an ID generated locally, for instance in transferring the music file, may be unique to a single transfer session and can be expected to be reused in the future to refer to a different file. Uniqueness and permanency may provide a measure of how unique an ID is within a collection and a measure of how long it was supposed to last.

A media file determined to have an ID globally unique would have a low probability of being a duplicate, such as $½^n$, where n is an integer very large relative to 2. A file name for a media file placed in any directory of the PC by a user may not be determined to be globally unique and hence has a much higher probability of being a duplicate, such as $½^m$, where m is an integer on the order of 2. Given enough context is available to determine that the ID is localized to a particular directory, the uniqueness of the ID can be judged as more certain, decreasing the probability of being a duplicate. Taking into consideration the average lifetime of a PC and the creation time of a media file on the PC, a uniqueness and permanency can be assigned to each media file.

Other data can be collected with respect to a media file to determine a confidence level of the identity of a media file with respect to another media file. For instance, given no other information on a media file, two files with the same encoding may have a small increased likelihood of being the same file than two files having different encoding. This is a very weak indicator, however it is an indicator, which may be considered in an evaluation in the absence of stronger correlation. Two files may be subjected to a software application that provides a fingerprinting service that analyzes the music files and compares then with a database to provide a recommendation on the identity of the two files such that the two files have common fingerprint to a certain confidence level. In addition, any activity initiated by the user on the PC can be captured as metadata. An application can correlate the activity with respect media files on the PC to assign a confidence level. For instance, if a user deletes a media file, the metadata regarding the media file and its deletion may be retained in a database, thought the actual media file has been deleted. Different artifacts regarding media files can be used to provide additional information to determine possible relationships between files.

The various confidence levels for a piece of metadata or sources of the metadata may be generated with respect to different features correlated to the same piece of metadata or the same sources of the metadata. An overall or combined confidence level for the same piece of metadata or the same sources of the metadata can be generated by combining the respective confidence levels of the different features. The combined confidence level may be realized as an average of the confidence levels of the different features. The combined confidence level may be realized as a weighted average of the confidence levels of the different features. The combined confidence level may be treated similar to probabilities. For example, a combined confidence level may correspond to the occurrence of two independent features, then the confidence level may be realized as the product of the confidence levels of the two features. In addition, the confidence levels and or combined confidence levels may be expressed by a base 2 logarithm to allow many orders of magnitude of confidence to be efficiently expressed and compared.

Source identification provides ID mapping of multiple IDs across multiple sources, allowing a variety of artifacts to be encoded into a metadata database. Using rules provided by an application, confidence levels can be assigned to various artifacts. Consider a mobile device having a secure digital (SD) card on which media files are stored, where these media files are managed by a PC. A media file may have a path on the SD card, where the path is unique on that SD card. The metadata collection on the mobile device, for that path, can be searched for related IDs. From the related IDs, a check can be made for the issuer of the ID. If the ID is determined to be an iTunes® ID, then the path can be taken as being from iTunes®. If an iTunes® database is on the PC, the PC metadata collection, which can include the iTunes® XML data, can be checked for the ID. If a match is found, then the file on the device is related to the iTunes® track on the PC to a certain level of confidence. If following the chain of connections to a particular iTunes® ID indicates that the media file on the PC is the same as on the device, the media sync of the PC can make some decisions on behalf of the user based on the confidence level in the relationship chain just determined. For example, it may be determined that the media file on the device can be deleted on behalf of the user with a certain level of confidence. The level of confidence may be used to determine that the file of the device was probably copied using iTunes® on the PC. The media file can be deleted from the mobile device and replaced with a different song, which is more desirable by the user, since there is confidence that the PC has another copy such that the song is not removed irretrievably for the user. This activity can be provided automatically by an application on the PC that syncs data with the mobile device. The correlation of multiple source identifications thus provides a mechanism to make intelligent decisions based on metadata to act on user preferences with a relatively high level of confidence.

However, general searching for metadata collections is not limited to searching a path. The search can start with any piece of information that is stored in the metadata collection. The search may be started from strings typed in by a user, leading to an artist of a media file, and used to determine characteristics of the artist accessed using the metadata such as the type of genre related to the work of the artist, the time period when the artist was well-known or active. This example relates a small amount of typing by the user to the likelihood that the user is interested in a certain genre and era of music, which is lower confidence relation than an exact path match, but is still valuable. In addition, use of artifacts in the metadata collection may be limited by a threshold level for the confidence level of the artifacts such that connections from artifacts having a confidence level under the threshold are not followed in the chain of metadata. In addition, the cumulative confidence level of a chain of metadata can be calculated in various embodiments.

The correlation of source IDs is not limited to a particular database system. In various embodiments, a file format, structured as defined in an associated ID dictionary, may be used to manage a media library based on maintaining IDs of sources of the media files, sources of artifacts related to media file, or combinations of sources of media files and general artifact metadata. The ID dictionary associated with the file format can include information and mapping of IDs relative to permanency and uniqueness as well as other characteristics associated with maintaining IDs of sources of information and media files. For instance, two IDs can be assigned to a track, where one ID is a local ID and the other ID is a permanent ID.

This information may be defined in an ID dictionary in which an entry is assigned an ID_type (permanent encoded as a 0 for example and local encoded as a 1 for example), an ID_issuer (encoded as an integer reference to an ID_issuer table), a uniqueness (an integer value correlated to a relative probability), a permanence (an integer value correlated to a relative probability), and a format (an integer value referenced to a table). This table entry is not the ID itself, but provides a descriptor for what the IDs are like. Other database structures and systems may be used to manage media content using preserved source IDs.

In various embodiments, a UI for managing media files on the device and pending transfers is provided. The UI may include graphical indicators for status (e.g., on device, on PC, etc) and/or actions (e.g., download, purchase, preview, email, play remotely). Some example UI screens from a device are provided in FIGS. 5-10.

The embodiments shown in FIGS. 1-4 may be implemented as a desktop application to synchronize media content with a mobile wireless communications device. The embodiments shown in FIGS. 1-4 may also allow a user to use a mobile wireless communications device to browse and synchronize a library on a PC with a library on the mobile wireless communications device.

In various embodiments, device configurations and operational methods are provided for a user of a mobile wireless communications device to remotely view and/or manage their music home music libraries directly from their mobile wireless communications device with the ability to synchronize/transfer music through wired connectivity and/or wirelessly and justifies them within their context of use. Such transfer may be realized in a personal computer (PC). Such transfer may be realized in a wireless server in which the user and/or the mobile wireless communications device are registered as being allowed to enter into such transfers. The wireless server may be configured in a personal computer. The mobile wireless communications device may be a handheld device such as a cell phone-type device. The mobile wireless communications device may be a portable computer such as a lap-top computer. Such configurations and operating structures provide a straight-forward user friendly way, both in a user's mobile wireless communications device and in a personal computer of the user, for managing multimedia files, audio files, video files, and/or combinations thereof, belonging to a user or which the user is allowed to access.

In various embodiments, transfer/sync of multimedia files, audio files, video files, and/or combinations thereof between a computer (and associated media managers of the computer) and a mobile wireless communications device may be accomplished using a number of mechanisms. The transfer/sync between the mobile wireless communications device and the wireless server maybe accomplished through a USB connection. The transfer/sync between the mobile wireless communications device and the wireless server maybe accomplished through a Wi-FI communication session. The transfer/sync between the mobile wireless communications device and the wireless server maybe accomplished over wide area network (WAN) such as a wireless network.

In various embodiments, a mobile wireless communications device is configured with hardware, software, and combinations thereof to view offline, from its associated PC or associated wireless server and offline from the Internet, a library or libraries that may include multimedia files, audio files, video files, photos, videos, podcasts, and/or combinations thereof in the mobile wireless communications device. Such libraries may include libraries of iTunes®, Windows Media Player®, other music libraries, video libraries, and other multimedia libraries. The mobile wireless communications device may include executable instructions allowing its user to view, edit, delete, and schedule multimedia, music, video, and/or combinations for sync between the mobile wireless communications device and its associated personal computer or wireless server. All changes/requests/transfers may occur automatically upon establishment of one of more of USB, Wi-Fi, or WAN connections to the associated personal computer or wireless server. In various embodiments, the personal computer may be configured with appropriate instrumentalities to operate as a wireless server. The hardware and software of the mobile wireless communications device may include a multimedia sync application having a remote management tool to manage a user's libraries of the user's PC, such as but not limited to music from the user's iTunes® or Windows Media Player® (WMP), directly from the mobile wireless communications device. Various embodiments provide functions to manage, play, and sync multimedia presentations, video, and/or music that bridge the gap between PC sync and remote access to realize media management from a handheld wireless device rather than limiting such management to a desktop.

In various embodiments, mobile wireless communications devices are configured to allow offline access to a user's entire PC music library and to allow a 2-way sync, including wireless, between the mobile wireless communications device and the target media manager on a user's PC. For example, a mobile wireless communications device may be configured to schedule downloads and syncs of media avoiding limitations associated with streaming the media content directly to the handset. The mobile wireless communications device may be configured with a remote management application and a wireless sync application, where each has access (an optimized copy) of the user's media library directly from the mobile wireless communications device. Access to this library may not require a network connection to an associated PC or a server on the Internet. The library may be arranged as a multimedia library, a music library, a video library, or a combination thereof. In an embodiment, an optimized version of a user's music library may be contained on the user's mobile wireless communications device allowing for offline viewing and management such that only the optimized music library file (i.e. an "index") is present on the user's mobile wireless communications device, not the actual songs themselves. Any edits or requests for download/sync will sync with the user's associated PC upon connection via USB, WAN, or WLAN (wireless local area network). New media content, such as new music content, that have been requested for download may be contained in a download "manager"/ queue and may be sent to the user's device upon the next USB or Wi-Fi connection. The download may be sent on the next connection in a wireless network to which the computer is coupled. In an embodiment, should the user choose, they can force transfer/download of any item in the pending download queue over a cellular network.

In various embodiments, a mobile wireless communications device may be configured with hardware and software that provide: simple ease of use for the user, integration between the mobile wireless communications device and a desktop manager and/or a media sync application of a wireless server configured in a personal computer, support of USB sync, WLAN sync, WAN sync, or sync using combinations thereof between a user's PC and their mobile wireless communications device, integration with different media players such as but not limited to iTunes® and Windows Media Player®, ability for a user to view their media libraries directly from the mobile wireless communications device without a network connection for viewing via a small/optimized copy of the libraries, ability to view library content by album, artist, genre, playlists, ability to add music, such as but not limited to individual songs, albums, artists, playlists to a download manager/queue, ability to transfer/synchronize media in the download queue with the user's mobile wireless communications device upon next USB or Wi-Fi connection to their associated PC or associated PCs, and a 2-way sync with media libraries on the users home PC. A 2-way allows for activity on a mobile wireless communications device to be conducted in a manner similar to the activity of the PC. For example, if a user deletes music or creates/edits a playlist from their mobile wireless communications device, the data can be transmitted wired and/or wirelessly, and these changes reflected in the media libraries on the user's associated PC, which may include iTunes® and WMP among others. Further, if a user deletes music or creates/edits a playlist from their associated PC via one or more libraries on the PC, the data can be transmitted wired and/or wirelessly, and these changes reflected on the mobile wireless communications device. For example, new media content that have been requested for download may be contained in a download manager/queue and may be sent to the user's mobile wireless communications device upon the next USB, Wi-Fi, or wireless network connection. Should the user choose they can force transfer/download any item in the pending download queue over a cellular network.

In various embodiments, a mobile wireless communications device may be configured to operate with any operating system that may be used in a cellular device. The mobile wireless communications device may be configured with access to media functions with external controls to virtually provide for unlimited storage for a user's media, with independence from the PC desktop to manage all user media needs directly from their portable wireless device, with an open marketplace to discover/acquire music directly from a portable wireless device, with automatic updates/sync of activity conducted on a portable wireless device, with ability to play music on a portable wireless device with other devices such as a car, a home stereo, or other such device, with remote access from the user's mobile wireless communications device to access to their PC library of music and other media.

Figure 5:
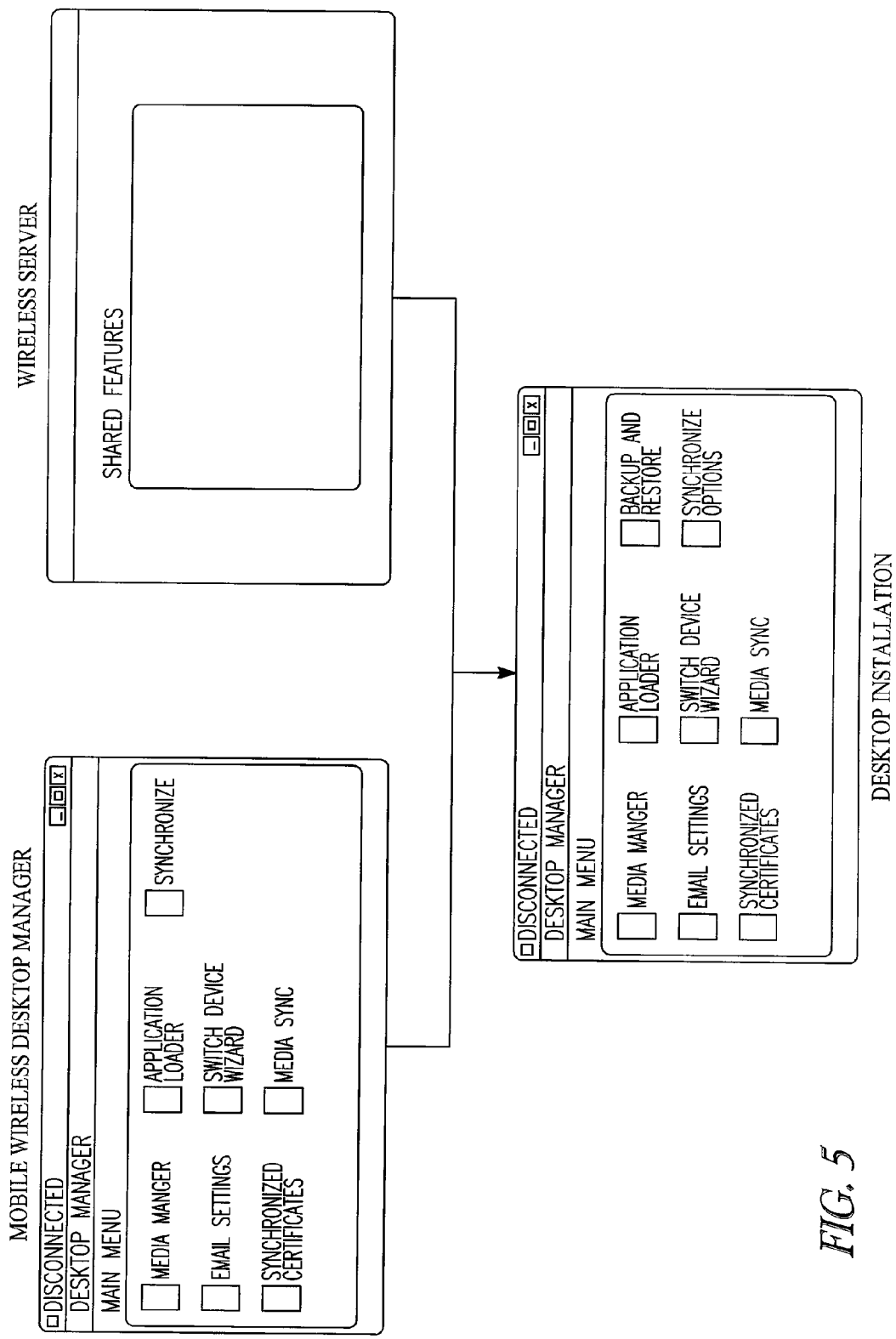
FIG. 5 illustrates an embodiment of a media wireless sync feature installed on a PC with installation of an associated wireless server, according to various embodiments.

In various embodiments, a media wireless sync feature may be installed on a PC with installation of an associated wireless server, as illustrated in FIG. 5. The installation may be realized using a USB connection. The installation may be realized initiated using a USB connection and completed over an Internet connection. The installation may be realized using a Wi-Fi connection. The installation may be realized initiated using a Wi-Fi connection and completed over an Internet connection. After completion of the installation of the media wireless sync feature, a message indicating that the media wireless features/functionality are enabled may be provided to the user via the mobile wireless communications device, the PC, and/or both.

The media sync application of the mobile wireless communications device may support multiple mobile wireless communications device/users within a home, based on a registration, for example based on a personal identification (PIN). The libraries and the sync to these libraries may be partitioned among the various users of the PC. For example, one person may choose to sync music with one library such as iTunes®, another person may choose to sync with another library such as Windows Media Player®, and a third person may choose to sync with both libraries. The user interface of the wireless server on the PC may allow for dynamic selection of supported media managers as well as remember the last media manager (store the identity of the last media manager or last several media managers) to which a specific mobile wireless communications device synchronized with it and to remember preferences associated with the synchronization. In an embodiment, a file may be specified not to be transferred to the mobile wireless communications device, unless the file is supported by the mobile wireless communications device. Users may be made aware of this through a graphic user interface, if a specific file or file type has been identified as not being selectable for sync. For example, music files that are not to be synced may be shown using an icon or other indicator of a lock condition, when a user is viewing their music library from the mobile wireless communications device.

Figure 6:
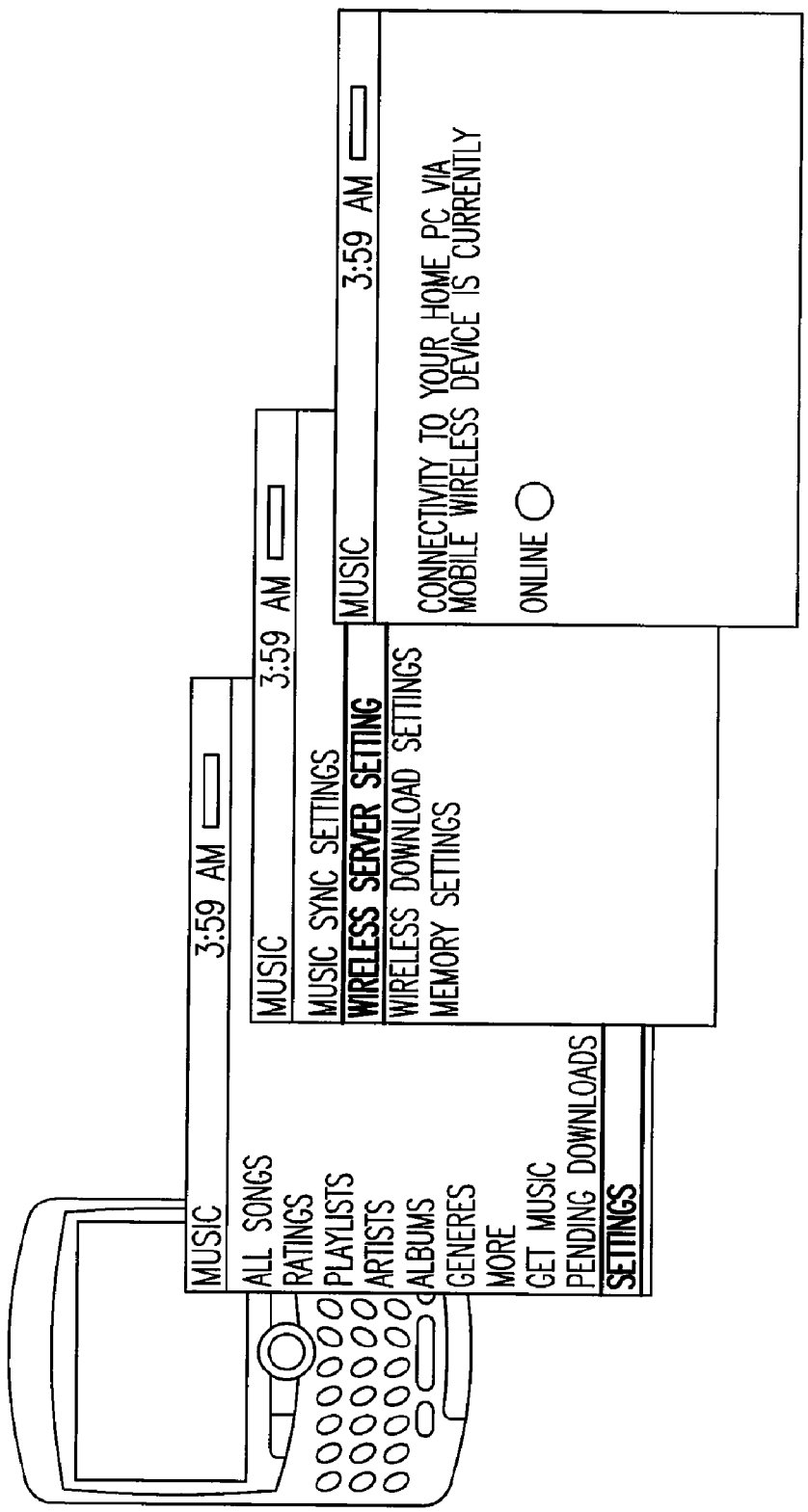
FIG. 6 illustrates an embodiment of a non-limiting example of a user interface showing connectivity, according to various embodiments.

From the user's mobile wireless communications device, the user may observe the status of connectivity to their home PC via a wireless server on the home PC. This view can enable the user to determine if they are able to sync and/or download content via Wi-Fi, WAN, or other connection. FIG. 6 illustrates a non-limiting example of a user interface showing connectivity. A media sync application provides a user with an ability to view (offline) either a media library directly from a mobile wireless communications device allowing them to view, edit, delete, and schedule music for sync. All changes/requests/music transfers can occur upon a USB, Wi-Fi, or WAN connection to their home PC. With a wireless server on a home PC offline, an error message may be generated to indicate the status of the wireless server when attempting to force a transfer or download via a network connection.

An optimized version of a user's music library contained by a library in the user's PC may be contained on the user's device allowing for offline viewing and management. The optimized media library file may be arranged as an index on the user's mobile wireless communications device. Media filed in the mobile wireless communications device may be stored in the mobile wireless communications device separate from the optimized media library file. During setup (and at any time) of the desktop media sync application, users can select which media manager or managers that they would like configured for remote management and wireless sync.

From a user's mobile wireless communications device, a user may able to enter the total music library or individual libraries and sort by all songs (name), artist, album, and music genre. The user may also be able to view by all playlists, standard and smart (automatic) as well as those contained in folders. When viewing a playlist from the mobile wireless communications device, users also may able to view/sort by all songs (name), artist, album, and music genre. Viewing and sorting is not limited to music but may be applied to photos, video, and other multimedia presentations. With the optimized music library file as an index present on the users mobile wireless communications device, and not all the actual songs themselves contained within the library, the optimized library may be sufficiently small allowing the library to be stored on the internal memory of the user's mobile wireless communications device. In various embodiments, swapping memory cards does not disable remote management.

In various embodiments, the optimized media library file on the user's mobile wireless communications device may be refreshed and kept in sync with the media libraries on the user's PC. This sync may provide automatic updating so that the most up to date view of the media library accessible to the PC is available to the user from their mobile wireless communications device. An updated/synchronized copy of the media library may be transferred to the user's mobile wireless communications device upon the next USB/WLAN/WAN connection to the desktop music sync application.

Figure 7:
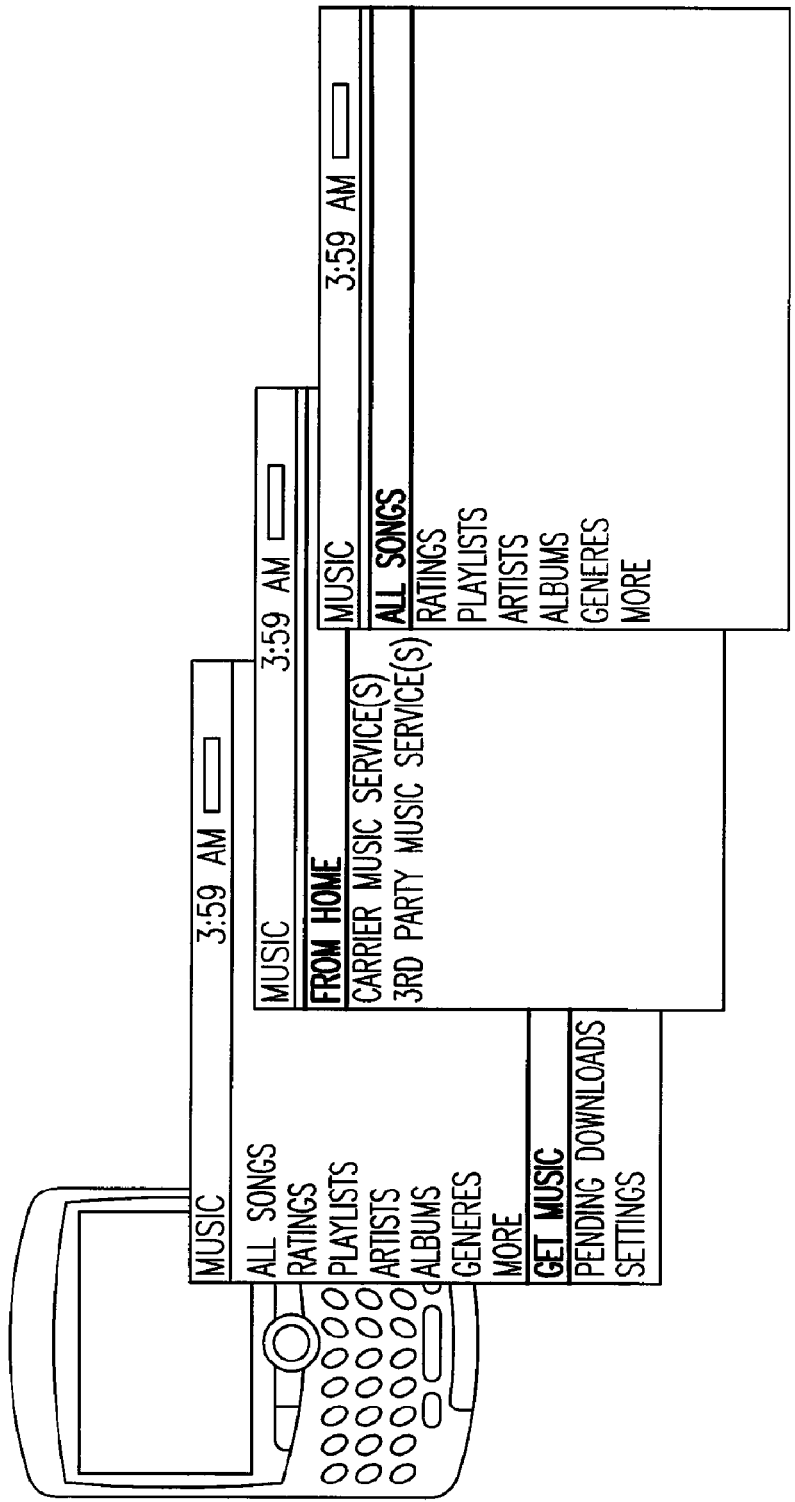
FIG. 7 illustrates an embodiment of an example of a user interface when accessing a home music library, according to various embodiments.

FIG. 7 shows an example of a user interface when accessing a home music library. The user interface is not limited to a home music library but may be libraries of other multimedia presentations. As shown, the user interface provides access and management of a user's music library, for example a user's iTunes® or WMP music library, that is easy to use, intuitive, and be structured in such a way that it allows users to easily view their music libraries directly from the music application on the mobile wireless communications device.

Figure 8:
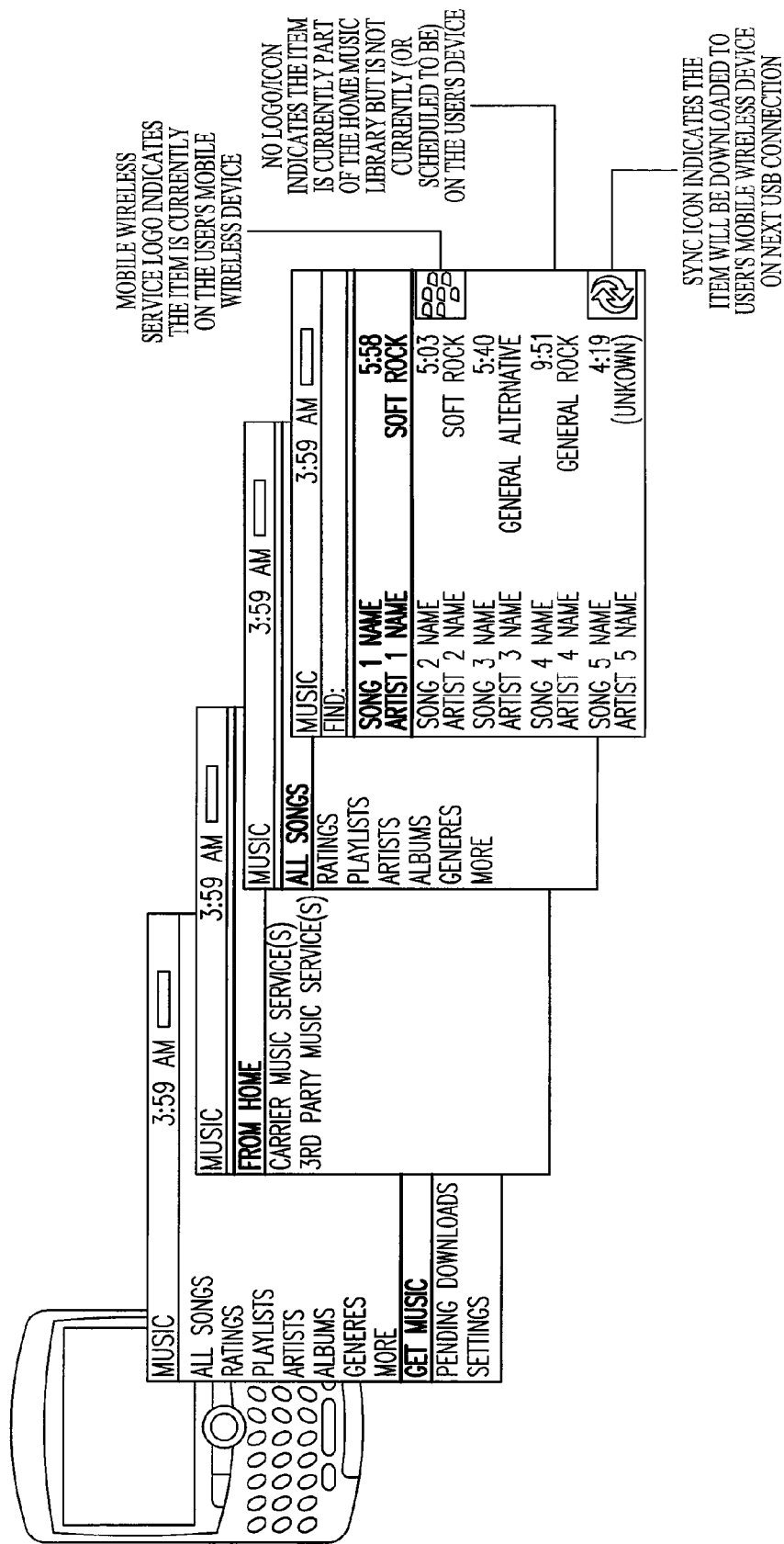
FIG. 8 illustrates an embodiment of an example of viewing a media library, according to various embodiments.

In viewing their home media library from the mobile wireless communications device, the view may be provided in a manner that it similar to how the media library is displayed on the local PC. FIG. 8 illustrates an example of viewing a media library that is easy to use, intuitive, and structured in such a way that it allows users to easily view their media library directly from the media application on the mobile wireless communications device. The view may also provide a view of media that is on their mobile wireless communications device vs. what is not on the mobile wireless communications device with respect to what is in the home libraries. The view may also provide a view of media that has been added to the media download manager as pending downloads that will be transferred/synchronized with their device upon the next USB sync, WLAN sync, or WAN sync with the mobile wireless communications device. The user may also be provided with an indication of the total amount of memory corresponding to media on their mobile wireless communications device including free/available memory, media at an associated PC such as a home PC, and media in the download manager pending download. The media may be further presented in various categories such as music, video, and other multimedia presentations.

In various embodiments, when a user views their home music library, it may be similar to how they view the media local to their mobile wireless communications device to edit the home media library. Users may be able to edit their home music library from a remote management application with a wireless sync feature allowing them to delete media, such as music, on a selected basis and/or edit playlists. For example, the selected basis allows for editing music based on individual songs, albums, artists, genres, or playlists. For example, using edit playlists as a basis allows for adding and/or removing songs contained in one or more playlists. These edits may sync with the users PC and the corresponding media manger library or libraries upon the next USB/WLAN/WAN connection to the desktop media sync application on their home PC. Delete actions may be accompanied by a prompt inquiring as to whether or not the user would like to delete the item from the specified library on the mobile wireless communications device only (keep file on computer) or from the specified library on the associated computer as well.

Figure 9:
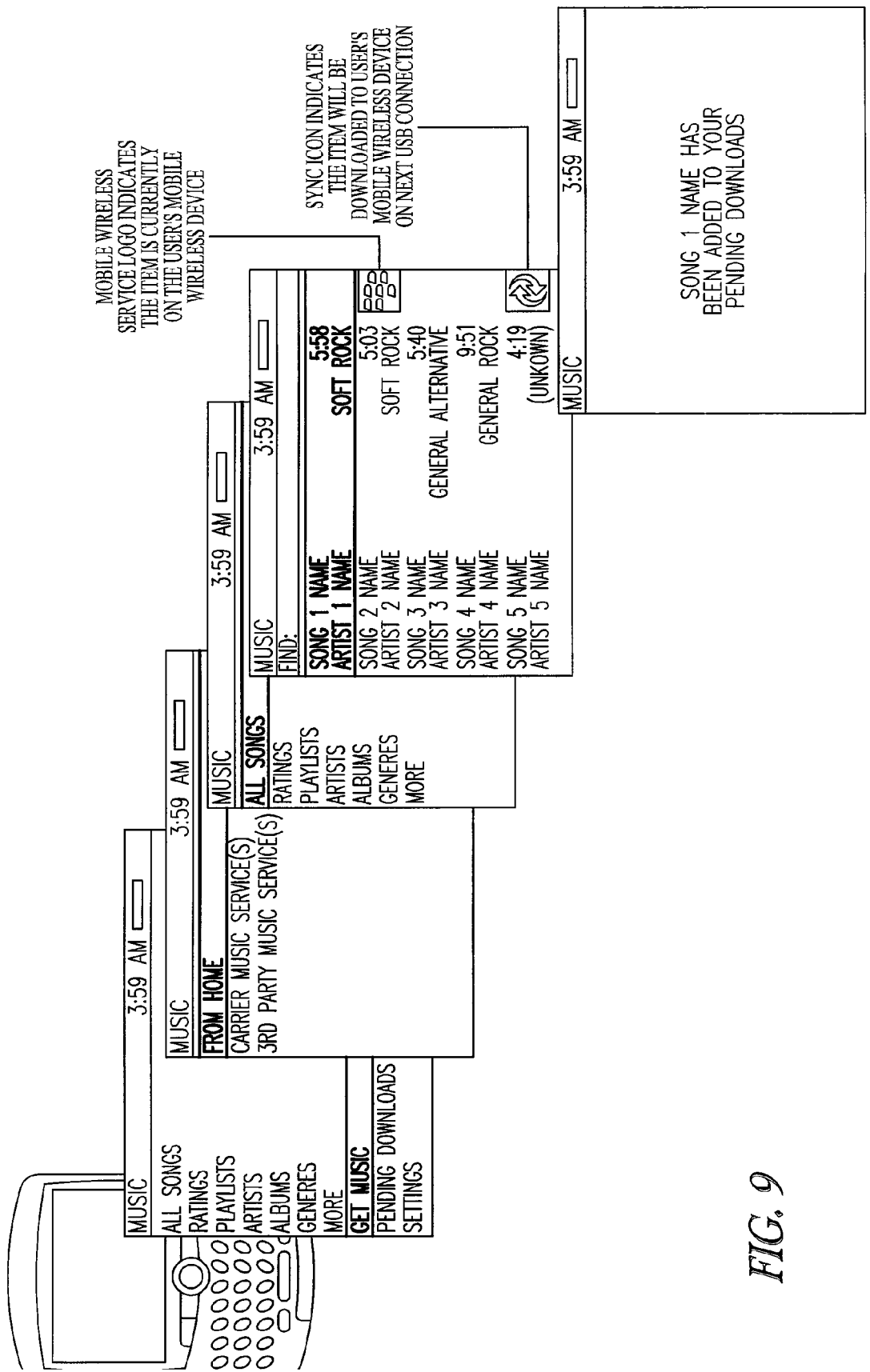
FIG. 9 shows an embodiment of an example of a user interface with respect to adding music to the download manager, according to various embodiments.

FIG. 9 shows an example of a user interface with respect to adding music to the download manager. While viewing a user's home music library, the user may add the following to a download music manager as pending downloads: individual songs, individual albums, individual artists (all songs by an individual artist), individual genres (all songs contained in a single genre), entire playlists, and other categories for arranging music. Additions are not limited to music, but apply to other multimedia presentations. As an example, this addition feature can be shown as a menu item called "sync with mobile wireless communications device" or "add to downloads" when any of the above categories is highlighted. This may be similar to how adding items local to a mobile wireless communications device is handled with respect to playlists local to the mobile wireless communications device. Users may be able to view all items that are currently "pending sync/download." A remote media access implementation may notify a user if they are attempting to schedule/sync content whose total is larger than the device's available/free memory (external plus internal). The user may be notified/prompted on their device of the total content they are attempting to sync (i.e. what is in the media download manager or "pending downloads" queue) and the available space on the mobile wireless communications device and be instructed to remove content from the sync list or device.

Figure 10:
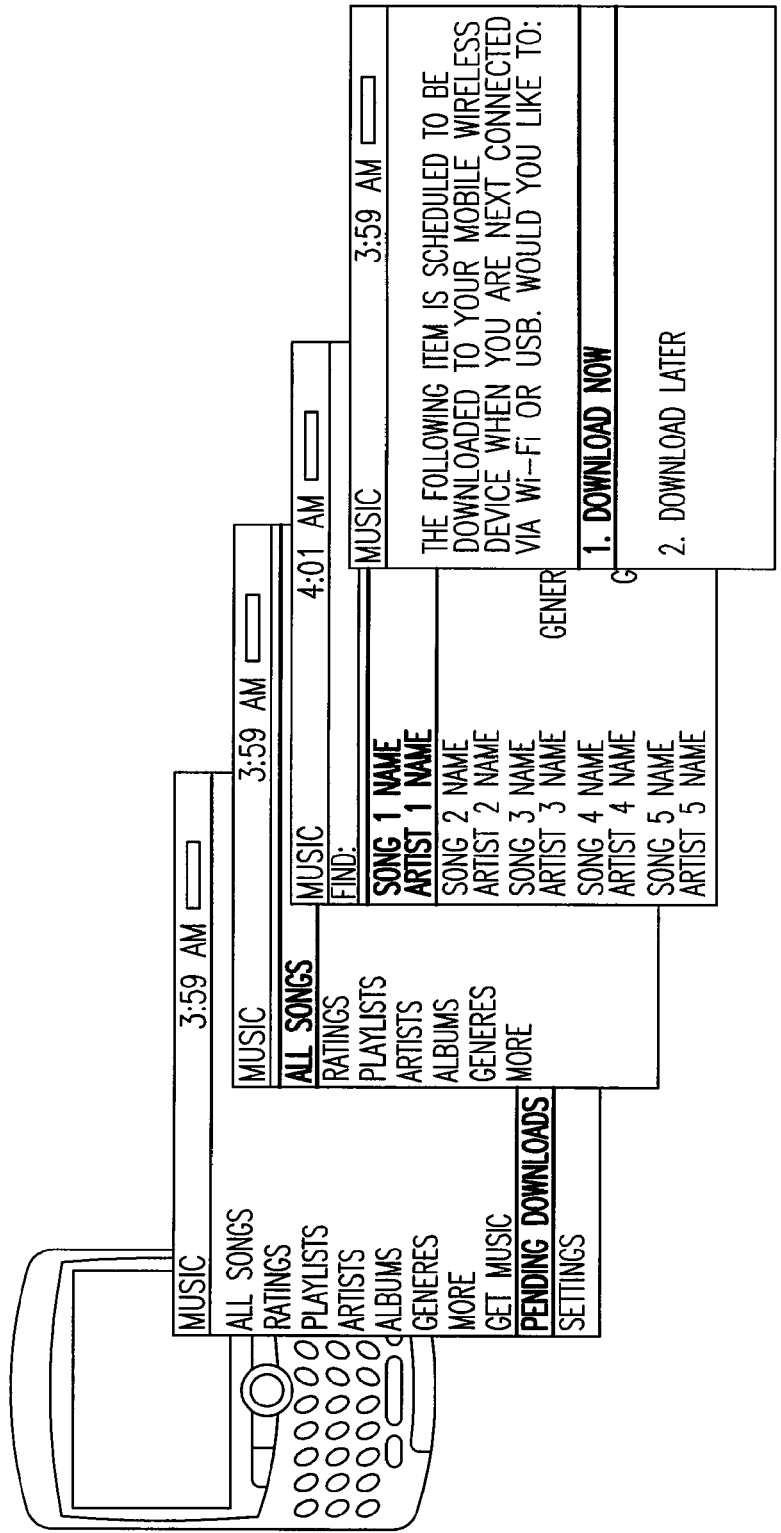
FIG. 10 shows an embodiment of an example of a user interface for viewing a download manager, according to various embodiments.

FIG. 10 shows an example of a user interface for viewing a download manager. This view provides users with the ability to view the media download manager for pending downloads directly from the media home screen of the mobile wireless communications device media player. For example, music that has been requested for download (added to the pending downloads/queue) can be delivered to the mobile wireless communications device upon the next USB, Wi-Fi, or WAN connection. Viewing the items in the pending downloads list may be similar to viewing music on a users mobile wireless communications device and can be sortable (with totals next to each in brackets) by all songs, album, artist, genre, playlists, and other categories.

A user may be provided with a view that indicates in a straight forward manner the total amount of memory corresponding to individual items in the download manager and to total items in the download manager. The following options may be available to the user when viewing the contents of the download manager: (1) delete (i.e. remove items from the download manager), which may include an item no longer being requested for transfer/sync with the device, and (2) download now, which allows for manual force transfer of media via a WAN. Users may be prompted that this may result in cellular data charges as per their existing mobile wireless communications device data plan. Other options may be provided.

Figure 11:
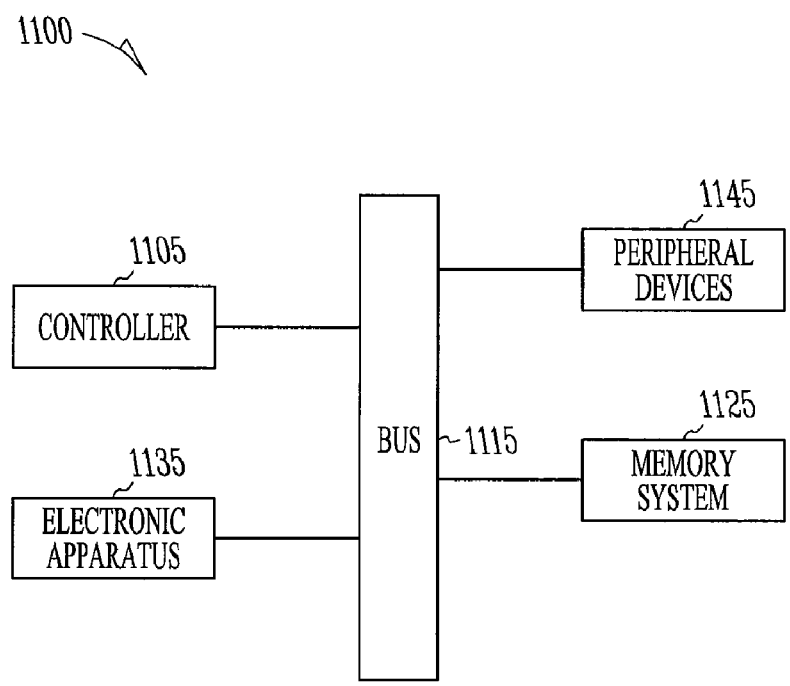
FIG. 11 depicts a diagram of an embodiment of a system having a controller and a memory system, according to various embodiments.

FIG. 11 depicts a diagram of an embodiment of a system 1100 having a controller 1105 and a memory system 1125. System 1100 also includes electronic apparatus 1135 and a bus 1115, where bus 1115 provides electrical conductivity among the components of system 1100. In an embodiment, bus 1115 includes an address bus, a data bus, and a control bus, each independently configured. In an alternative embodiment, bus 1115 uses common conductive lines for providing one or more of address, data, or control, the use of which is regulated by controller 1105. Bus 1115 may be realized as multiple busses. In an embodiment, electronic apparatus 1135 is additional memory system configured in a manner similar to memory system 1125. In an embodiment, additional peripheral device or devices 1145 are coupled to bus 1115. In an embodiment, peripheral devices 1145 include displays, additional storage memory system, and/or other control devices that may operate in conjunction with controller 1105 and/or memory system 1125. In an embodiment, controller 1105 is a processor.

Controller 1105 and memory system 1125 can be arranged to manage media content and associated information on system 1100. In an embodiment, system 1100 is arranged as a PC. The PC may include instrumentality distributed throughout the PC to operate as a wireless server. System 1100 arranged as a PC can operate according to any of the various embodiments discussed herein to manage media content and associated information within the PC and/or in conjunction with one or more mobile devices such as mobile wireless communications devices.

In an embodiment, system 1100 is arranged as a mobile device. The mobile device may be a mobile wireless communications device. System 1100 arranged as a mobile device can operate according to any of the various embodiments discussed herein to manage media content and associated information within the mobile device, and/or in conjunction with a PC or other apparatus having software and/or hardware to manage media content.

Various embodiments or combination of embodiments for apparatus and methods for a system, such as a PC, to manage media content, as described herein, can be realized in hardware implementations, software implementations, and combinations of hardware and software implementations. These implementations may include a machine-readable medium having machine-executable instructions, such as a computer-readable medium having computer-executable instructions, for operating the system in a relationship with one or more mobile devices such that media content and associated information is managed between the system and the mobile device. The communications of the system with a mobile wireless communications device can be conducted on a secured basis. The machine-readable medium is not limited to any one type of medium.

Various embodiments or combination of embodiments for apparatus and methods for a mobile device, such as a mobile wireless communications device, as described herein, can be realized in hardware implementations, software implementations, and combinations of hardware and software implementations. These implementations may include a machine-readable medium having machine-executable instructions, such as a computer-readable medium having computer-executable instructions, for operating the mobile device to manage its media content and associated information within the mobile device, in conjunction with a system, such as a PC, and/or with respect to other mobile devices. The communications between a mobile wireless communications device and the system can be conducted on a secured basis. The machine-readable medium is not limited to any one type of medium.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:

acquiring information, in a system using a controller of the system, about an item of media content from a plurality of sources, the information including artifacts about the item of media content such that at least one artifact is different from the media content itself and different from one or more media files in which the media content is formatted, each artifact being associated with a source from which the artifact is acquired, the source being one of the plurality of sources;

storing the information in a storage medium;

maintaining, in the storage medium, a source identification of each source with respect to the information acquired from the respective source and a source identification of each source with respect to a media file, containing the media content, acquired from the respective source, the source identification being an identification of the source at the time of acquiring the information or the media file that is preserved from acquiring the information or the media file, the source identification of each source, from which the media file containing the media content is acquired, categorized according to uniqueness and permanency with respect to the media file;

assigning a confidence level to an artifact, having a source, based on two or more factors including a confidence level for the source of the artifact; and managing the media file using the confidence level.

2. The method of claim 1, wherein acquiring information includes acquiring information from a plurality of media libraries.

3. The method of claim 2, wherein acquiring information from a plurality of media libraries includes acquiring information from a plurality of music libraries and/or on-line music stores.

4. The method of claim 1, wherein storing the information includes storing the information in a library file such that an original identification of the source is maintained.

5. A method comprising:

acquiring information, in a system using a controller of the system, about an item of media content from a plurality of sources, the information including artifacts about the item of media content such that at least one artifact is different from the media content itself and different from one or more media files in which the media content is formatted, each artifact being associated with a source from which the artifact is acquired, the source being one of the plurality of sources;

storing the information in a storage medium;

maintaining, in the storage medium, a source identification of each source with respect to the information acquired from the respective source and a source identification of each source with respect to a media file, containing the media content, acquired from the respective source, the source identification being an identification of the source at the time of acquiring the information or the media file that is preserved from acquiring the information or the media file, the source identification of each source, from which the media file containing the media content is acquired, categorized according to uniqueness and permanency with respect to the media file; and managing the media files using a confidence level for uniqueness of each media file and a confidence level for permanency of each media file.

6. The method of claim 5, wherein storing the information includes storing the information in a library in a computer memory such that original identifications of sources of multiple media files having essentially the same media content, at the time of acquiring, are maintained.

7. A method comprising:

acquiring information, in a system using a controller of the system, about an item of media content from a plurality of sources, the information including artifacts about the item of media content such that at least one artifact is different from the media content itself and different from one or more media files in which the media content is formatted, each artifact being associated with a source from which the artifact is acquired, the source being one of the plurality of sources;

storing the information in a storage medium;

maintaining, in the storage medium, a source identification of each source with respect to the information acquired from the respective source and a source identification of each source with respect to a media file, containing the media content, acquired from the respective source, the source identification being an identification of the source at the time of acquiring the information or the media file that is preserved from acquiring the information or the media file, the source identification of each source, from which the media file containing the media content is acquired, categorized according to uniqueness and permanency with respect to the media file;

searching on-line sources for additional information regarding the item of media content;

storing an artifact acquired from searching on-line sources;

assigning a confidence level to the artifact; and managing the item of media content, using stored artifacts and associated confidence levels associated with the item of media content, with respect to other media content.

8. The method of claim 7, wherein acquiring information about an item of media content from a plurality of sources includes acquiring information about the item of media content from a mobile wireless communication device.

9. A machine-readable storage medium having instructions stored thereon, which instructions when performed by a machine, cause the machine to perform operations comprising:

acquiring information, in the machine using a controller of the machine, about an item of media content from a plurality of sources, the information including artifacts about the item of media content such that at least one artifact is different from the media content itself and different from one or more media files in which the media content is formatted, each artifact being associated with a source from which the artifact is acquired, the source being one of the plurality of sources;

storing the information in a storage medium; and maintaining, in the storage medium, a source identification of each source with respect to the information acquired from the respective source and a source identification of each source with respect to a media file, containing the media content, acquired from the respective source, the source identification being an identification of the source at the time of acquiring the information or the media file that is preserved from acquiring the information or the media file, the source identification of each source, from which the media file containing the media content is acquired, categorized according to uniqueness and permanency with respect to the media file, wherein the instructions include assigning a confidence level to an artifact and managing the media file using the confidence level.

10. The machine-readable storage medium of claim 9, wherein storing the information includes storing the information in a library file.

11. The machine-readable storage medium of claim 9, wherein storing the information includes storing the information in a library in a computer memory.

12. The machine-readable storage medium of claim 9, wherein acquiring information includes acquiring information from a plurality of media libraries.

13. The machine-readable storage medium of claim 12, wherein acquiring information from a plurality of media libraries includes acquiring information from a plurality of music libraries and/or on-line music stores.

14. A machine-readable storage medium having instructions stored thereon, which instructions when performed by a machine, cause the machine to perform operations comprising:

acquiring information, in the machine using a controller of the machine, about an item of media content from a plurality of sources, the information including artifacts about the item of media content such that at least one artifact is different from the media content itself and different from one or more media files in which the media content is formatted, each artifact being associated with a source from which the artifact is acquired, the source being one of the plurality of sources;

storing the information in a storage medium; and maintaining, in the storage medium, a source identification of each source with respect to the information acquired from the respective source and a source identification of each source with respect to a media file, containing the media content, acquired from the respective source, the source identification being an identification of the source at the time of acquiring the information or the media file that is preserved from acquiring the information or the media file, the source identification of each source, from which the media file containing the media content is acquired, categorized according to uniqueness and permanency with respect to the media file, wherein the instructions include:

searching on-line sources for additional information regarding the item of media content;

storing an artifact acquired from searching on-line sources;

assigning a confidence level to the artifact; and managing the media file, using stored artifacts and associated confidence levels associated with the item of media content, with respect to other media content.

15. The machine-readable storage medium of claim 14, wherein acquiring information includes acquiring information about the item of media content from a mobile wireless communication device.

16. An apparatus comprising:

a processor; and a machine-readable medium that stores instructions, the machine-readable medium operably coupled to the processor such that the instructions, when executed by the processor, cause the apparatus to perform operations comprising:

acquiring information about an item of media content from a plurality of sources, the information including artifacts about the item of media content such that at least one artifact is different from the media content itself and different from one or more media files in which the media content is formatted, each artifact being associated with a source from which the artifact is acquired, the source being one of the plurality of sources;

storing the information in a storage medium; and maintaining, in the storage medium, a source identification of each source with respect to the information acquired from the respective source and a source identification of each source with respect to a media file, containing the media content, acquired from the respective source, the source identification being an identification of the source at the time of acquiring the information or the media file that is preserved from acquiring the information or the media file, the source identification of each source, from which the media file containing the media content is acquired, categorized according to uniqueness and permanency with respect to the media file, wherein the instructions include assigning a confidence level to an artifact and managing the media file using the confidence level.

17. The apparatus of claim 16, wherein storing the information includes storing the information in a library file.

18. The apparatus of claim 16, wherein storing the information includes storing the information in a library in a computer memory.

19. The apparatus of claim 16, wherein acquiring information includes acquiring information from a plurality of media libraries.

20. The apparatus of claim 19, wherein acquiring information from a plurality of media libraries includes acquiring information from a plurality of music libraries and/or on-line music stores.

21. An apparatus comprising:

a processor; and a machine-readable medium that stores instructions, the machine-readable medium operably coupled to the processor such that the instructions, when executed by the processor, cause the apparatus to perform operations comprising:

acquiring information about an item of media content from a plurality of sources, the information including artifacts about the item of media content such that at least one artifact is different from the media content itself and different from one or more media files in which the media content is formatted, each artifact being associated with a source from which the artifact is acquired, the source being one of the plurality of sources;

storing the information in a storage medium; and maintaining, in the storage medium, a source identification of each source with respect to the information acquired from the respective source and a source identification of each source with respect to a media file, containing the media content, acquired from the respective source, the source identification being an identification of the source at the time of acquiring the information or the media file that is preserved from acquiring the information or the media file, the source identification of each source, from which the media file containing the media content is acquired, categorized according to uniqueness and permanency with respect to the media file, wherein the instructions include:

searching on-line sources for additional information regarding the item of media content;

storing an artifact acquired from searching on-line sources;

assigning a confidence level to the artifact; and managing the item of media content, using stored artifacts and associated confidence levels associated with the item of media content, with respect to other media content.

22. The apparatus of claim 21, wherein acquiring information includes acquiring information from a mobile wireless communication device.

23. The apparatus of claim 21, wherein the apparatus is configured as a mobile wireless communication device.

24. The apparatus of claim 21, wherein the apparatus is a stationary personal computer.

25. The apparatus of claim 21, wherein the apparatus is a stationary personal computer having a configuration including instrumentality to operate as a wireless server.

* * * * *